(12) United States Patent
Peirce

(10) Patent No.: US 8,474,762 B2
(45) Date of Patent: Jul. 2, 2013

(54) AIRCRAFT SLAT ASSEMBLY

(75) Inventor: Robert James Peirce, Radstock (GB)

(73) Assignee: Airbus Operations Limited, Bristol (GB)

( * ) Notice: Subject to any disclaimer, the term of this patent is extended or adjusted under 35 U.S.C. 154(b) by 3320 days.

(21) Appl. No.: 13/115,864

(22) Filed: May 25, 2011

(65) Prior Publication Data

US 2011/0290946 A1    Dec. 1, 2011

(51) Int. Cl.
   *B64C 3/58* (2006.01)
(52) U.S. Cl.
   USPC .......................................... 244/213; 244/214
(58) Field of Classification Search
   USPC ........................................ 244/214, 213, 216
   See application file for complete search history.

(56) References Cited

U.S. PATENT DOCUMENTS

| | | | | |
|---|---|---|---|---|
| 2,620,147 A | * | 12/1952 | Cook, Jr. et al. | 244/216 |
| 3,785,594 A | * | 1/1974 | Lee | 244/216 |
| 3,935,754 A | * | 2/1976 | Comollo | 74/665 F |
| 4,360,176 A | * | 11/1982 | Brown | 244/214 |
| 4,399,970 A | * | 8/1983 | Evans | 244/214 |
| 4,437,631 A | * | 3/1984 | Martens et al. | 244/214 |
| 4,448,375 A | * | 5/1984 | Herndon | 244/216 |
| 4,470,569 A | * | 9/1984 | Shaffer et al. | 244/214 |
| 4,471,927 A | * | 9/1984 | Rudolph et al. | 244/215 |
| 4,471,928 A | * | 9/1984 | Cole | 244/215 |
| 4,640,477 A | * | 2/1987 | Pace | 244/214 |
| 4,650,140 A | * | 3/1987 | Cole | 244/214 |
| 4,687,162 A | * | 8/1987 | Johnson et al. | 244/213 |
| 4,753,402 A | * | 6/1988 | Cole | 244/210 |
| 4,838,503 A | * | 6/1989 | Williams | 244/214 |
| 5,544,847 A | * | 8/1996 | Bliesner | 244/214 |
| 5,628,477 A | * | 5/1997 | Caferro et al. | 244/214 |
| 5,680,124 A | * | 10/1997 | Bedell et al. | 340/945 |
| 5,686,907 A | * | 11/1997 | Bedell et al. | 340/945 |
| 5,806,805 A | * | 9/1998 | Elbert et al. | 244/195 |
| 5,839,699 A | * | 11/1998 | Bliesner | 244/214 |
| 5,927,656 A | * | 7/1999 | Hinkleman | 244/203 |
| 6,149,105 A | * | 11/2000 | Jaggard | 244/214 |
| 6,299,108 B1 | * | 10/2001 | Lindstrom et al. | 244/213 |
| 6,466,141 B1 | * | 10/2002 | McKay et al. | 340/963 |
| 6,796,534 B2 | * | 9/2004 | Beyer et al. | 244/214 |
| 7,744,034 B2 | * | 6/2010 | Coughlin | 244/129.4 |
| 7,766,282 B2 | * | 8/2010 | Kordel et al. | 244/215 |

(Continued)

FOREIGN PATENT DOCUMENTS

| | | |
|---|---|---|
| EP | 0726201 | 11/1995 |
| EP | 1088753 | 4/2001 |

(Continued)

OTHER PUBLICATIONS

UK Search Report for GB 1008773.2 mailed Aug. 5, 2010.

*Primary Examiner* — Christopher P Ellis
*Assistant Examiner* — Medhat Badawi
(74) *Attorney, Agent, or Firm* — Lowe Hauptman Ham & Berner, LLP

(57) ABSTRACT

An aircraft slat assembly comprises a slat, two tracks and two joints, each joint connecting a respective track to the slat. Each track is moveable on a wing structure between a fully extended position and a stowed position. Each joint is arranged to allow relative rotation between the slat and the respective track such that the slat is able to adopt a skewed position in which one track is in the fully extended position and the other track is in the stowed position.

9 Claims, 7 Drawing Sheets

U.S. PATENT DOCUMENTS

| | | | |
|---|---|---|---|
| 7,878,459 B2 * | 2/2011 | Mabe et al. | 244/213 |
| 8,181,913 B2 * | 5/2012 | Jaggard et al. | 244/214 |
| 2002/0005462 A1 * | 1/2002 | Broadbent | 244/214 |
| 2002/0195527 A1 * | 12/2002 | Broadbent | 244/214 |
| 2005/0178925 A1 * | 8/2005 | Broadbent | 244/214 |
| 2006/0000952 A1 * | 1/2006 | Rampton et al. | 244/214 |
| 2006/0102803 A1 * | 5/2006 | Wheaton et al. | 244/214 |
| 2007/0045477 A1 * | 3/2007 | Armstrong et al. | 244/214 |
| 2007/0102587 A1 * | 5/2007 | Jones et al. | 244/214 |
| 2007/0241236 A1 * | 10/2007 | Whitehouse et al. | 244/214 |
| 2009/0001224 A1 * | 1/2009 | Perez-Sanchez | 244/214 |
| 2009/0072093 A1 * | 3/2009 | Fox et al. | 244/214 |
| 2009/0272843 A1 * | 11/2009 | Schlipf | 244/99.3 |
| 2009/0272853 A1 * | 11/2009 | Raudszus et al. | 244/214 |
| 2009/0302168 A1 * | 12/2009 | Hetrick et al. | 244/214 |
| 2010/0025537 A1 * | 2/2010 | Wheaton et al. | 244/214 |
| 2010/0084515 A1 * | 4/2010 | Jaggard | 244/214 |
| 2010/0163685 A1 * | 7/2010 | Vormezeele et al. | 244/214 |
| 2011/0024575 A1 * | 2/2011 | Wheaton et al. | 244/214 |
| 2011/0290945 A1 * | 12/2011 | Peirce | 244/213 |

FOREIGN PATENT DOCUMENTS

| | | |
|---|---|---|
| EP | 1088753 A2 * | 4/2001 |
| GB | 2050262 A | 1/1981 |
| WO | 2009/150445 A1 | 12/2009 |

* cited by examiner

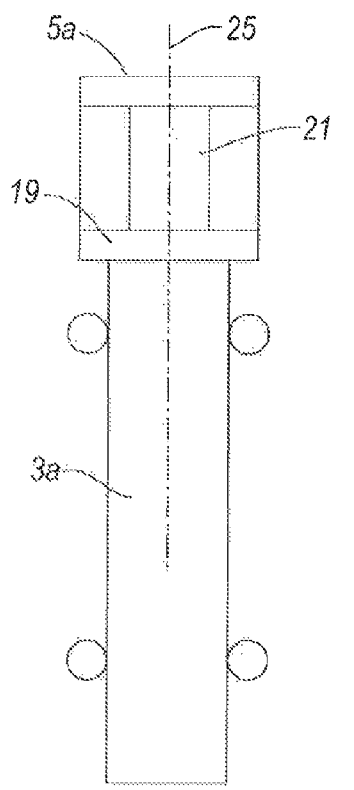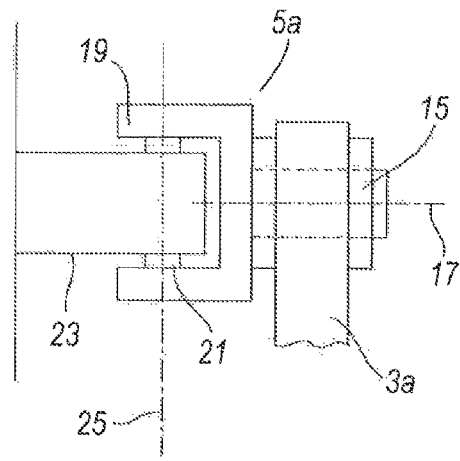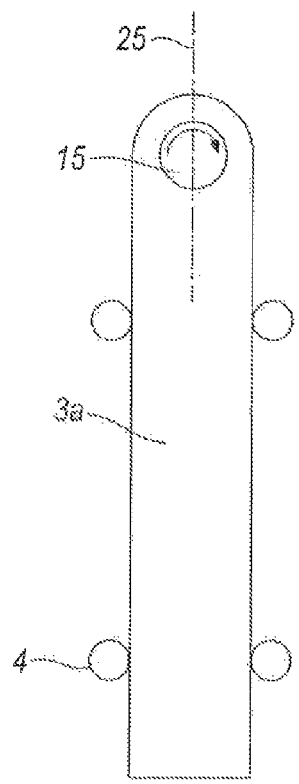
Fig.4A
Fig.4B
Fig.4C

AIRCRAFT SLAT ASSEMBLY

RELATED APPLICATIONS

The present application is based on, and claims priority from, Great Britain Application Number 1008773.2, filed May 26, 2010, the disclosure of which is hereby incorporated by reference herein in its entirety.

TECHNICAL FIELD

The present invention relates to an aircraft slat assembly, and more particularly to an aircraft slat assembly comprising a track-mounted slat.

BACKGROUND OF THE INVENTION

It is well known to provide a slat assembly comprising a slat connected to a plurality of tracks mounted on a fixed wing structure. The tracks are moveable relative to the fixed wing between an extended position in which the slat is deployed, and a stowed position, in which the slat is stowed on the fixed wing leading edge. The assembly typically comprises actuators for moving the tracks (for example by way of a rack and pinion connection). The shape of the tracks defines the position of the slat as it is deployed; the tracks may be a number of different shapes but are typically arcuate to define an arced forward and downward movement as the slat is deployed.

The tracks are connected to the slat, by a joint (sometimes referred to as a knuckle joint). In a known design (shown in FIGS. 1 and 2 and discussed in more detail in due course), a first track is connected to the slat by a master joint and a second, parallel, track is connected to the slat by a sub-master joint. Both the master and sub-master joints comprise links connecting the rear of the slat to their associated track. The links are mounted on spherical bearings such that the slat assembly is able to accommodate small changes to the slat geometry or position (for example bending or twisting) caused by, for example, aerodynamic loading.

The actuators used to move the slat are extremely robust and have met all the airworthiness requirements to date, but new airworthiness requirements may now require failure of an actuator to be considered. In the event of this theoretical failure of an actuator, only one of the tracks might be driveable between an extended and stowed position. In the above-mentioned slat assembly, the spherical bearings can accommodate a very small scale rotation of the slat, but under any substantive differential movement of the tracks (which would otherwise cause skew of the slat), the links would begin to interfere with the lugs on the slat/track and excessive loads may be generated. This would prevent the working track from continuing to operate without risking damage or failure of the joint.

Detection systems, to detect the misalignment of slats and to shut down the slat actuators in the event of misalignment, have been suggested. For example, EP0726201 describes an arrangement which detects when the slat becomes skewed beyond normal limits established for normal structural and thermal misalignments, and which stops further movement of the slats. By way of another example, EP 1088753 describes a skew detection system in which a control computer is arranged to shut down operation of the slat if the slat becomes skewed by more than a predetermined value. These detection systems can be complex. The detection systems also introduce a potential risk because in the event that the detection system malfunctions, the pilot may be able to continue to operate the slat assembly and thereby cause damage to the assembly.

SUMMARY OF THE INVENTION

The present invention seeks to mitigate at least some of the above-mentioned problems.

According to a first aspect of the invention, there is provided an aircraft slat assembly comprising a slat, two tracks and two joints, each joint connecting a respective track to the slat, and each track being moveable on a wing structure between a fully extended position and a stowed position, wherein each joint is arranged to allow relative rotation between the slat and the respective track such that the slat is able to adopt a skewed position in which one track is in the fully extended position and the other track is in the stowed position. By providing joints that allow the slat to adopt the most extreme skewed position, one of the tracks can continue to be driven (to or from the extended position) when the other track is inoperable. This reduces, and preferably removes, the risk of the joints being damaged by excessive skew. This also reduces, and preferably removes, the need for a warning and/or monitoring device associated with such a condition.

The fully extended position of the tracks will be readily identifiable by the skilled person and is typically the position of the track when the slat is deployed in its most extreme position. When the track is in the fully extended position, the slat is typically located in front of, and slightly below, the fixed wing leading edge to increase the effective camber of the wing. The angle of skew of the slat when the tracks are in the stowed and fully extended positions respectively, depends on the aircraft in question but may be at least 8 degrees, and more preferably at least 12 degrees. The angle of skew may be less than 16 degrees. The angle of skew will be readily identifiable and is typically the resultant angle of the vertical deflection and the horizontal (fore-aft) deflection, of one end of the slat relative to the other.

It will be appreciated that having the joints arranged to allow relative rotation to the skewed position does not preclude the possibility of the joints being arranged to allow relative rotation only after a certain threshold force is exceeded, but does preclude the possibility of relative rotation (to the skewed position) only occurring after failure of a non-sacrificial component.

The joints are arranged in any manner which allows the slat to adopt a skewed position in which one track is in the fully extended position and the other track is in the stowed position. The slat may be rotatably moveable about a first axis in each joint, the first axis being fixedly orientated relative to the respective track. By having a first axis that is fixedly orientated relative to the respective track, it is easier to ensure the structure of the joint does not interfere with the surrounding structure of the slat and/or track during skew of the slat, which might otherwise limit the range of movement provided by the slat. The first axes of each joint are preferably parallel.

The slat may also be rotatable about a second axis in each joint. The orientation of the second axis may be moveable relative to the first axis, but is preferably fixedly-orientated relative to the first axis.

The second axis is preferably perpendicular to the first axis. In such an arrangement, the slat can undergo a net rotation by simply rotating by appropriate amounts about each of the first and second axes. The first and second axes preferably intersect.

The pitch of the slat (relative to the tracks) is preferably fixed. Thus, the slat may be unable to rotate about an axis that is parallel to the length of the slat.

The second axis is preferably rotatable about the first axis. Only one of the two joints may be arranged to allow lateral movement of the slat relative to the respective track. The joint that allows lateral movement of the slat relative to the track may be referred to as a "sub-master" joint, and the other joint (which does not allow any lateral movement and is typically arranged to react loads into the fixed wing structure) may be referred to as a "master" joint. The use of a sub-master joint to allow lateral movement of the slat relative to the track may be especially beneficial in embodiments of the present invention, since the assembly is often arranged such that the slat often undergoes lateral movement relative to one of the tracks during movement to the skewed position. The sub-master joint preferably comprises a swing link pivotably mounted on the track.

The slat assembly may comprise a multiplicity of tracks and a multiplicity of joints, each track being connected to the slat by one of the joints.

The slat assembly may comprise an actuator assembly for moving the tracks between the stowed and fully extended positions. The actuator assembly may comprise a common drive means arranged to drive both tracks. For example the actuator assembly may comprise a drive shaft arranged to drive both tracks. Each track and the drive shaft may be operably linked by a gearbox. Embodiments of the present invention may be particularly beneficial when using a common drive means, since a malfunction (for example in one of the gearboxes) may mean that one track continues to be driven, whilst the other does not (potentially leading to a skewed configuration).

According to another aspect of the invention, there is provided an aircraft comprising the slat assembly described herein. The aircraft may comprise a plurality, or even a multiplicity of the slat assemblies.

The present invention is of greater application to larger aircraft. The aircraft is preferably heavier than 50 tonnes dry weight, and more preferably heavier than 100 tonnes dry weight. The aircraft is preferably of a size equivalent to an aircraft designed to carry more than 75 passengers, and more preferably more than 100 passengers.

According to a further aspect of the invention, there is provided a method of moving an aircraft slat, the method comprising step of moving at least one of two tracks connected to the slat such that the slat adopts a skewed position in which one track is in a fully extended position and the other track is in a stowed position.

The present invention may also be applicable to other aircraft control surfaces, such as trailing edge flaps. According to yet another aspect of the invention, there is provided an aircraft control surface assembly comprising a control surface (for example a slat or flap), two tracks and two joints, each joint connecting a respective track to the control surface, and each track being moveable on an aircraft structure between a fully extended position and a stowed position, wherein each joint is arranged to allow relative rotation between the control surface and the respective track such that the control surface is able to adopt a skewed position in which one track is in the fully extended position and the other track is in the stowed position.

It will be appreciated that any features described with reference to one aspect of the invention are equally applicable to any other aspect of the invention.

DESCRIPTION OF THE DRAWINGS

Various embodiments of the invention will now be described, by way of example only, with reference to the accompanying schematic drawings of which:

FIGS. 4A to 4C are three schematic views of the master joint in the slat assembly of FIG. 3A;

DETAILED DESCRIPTION

Figure 1:
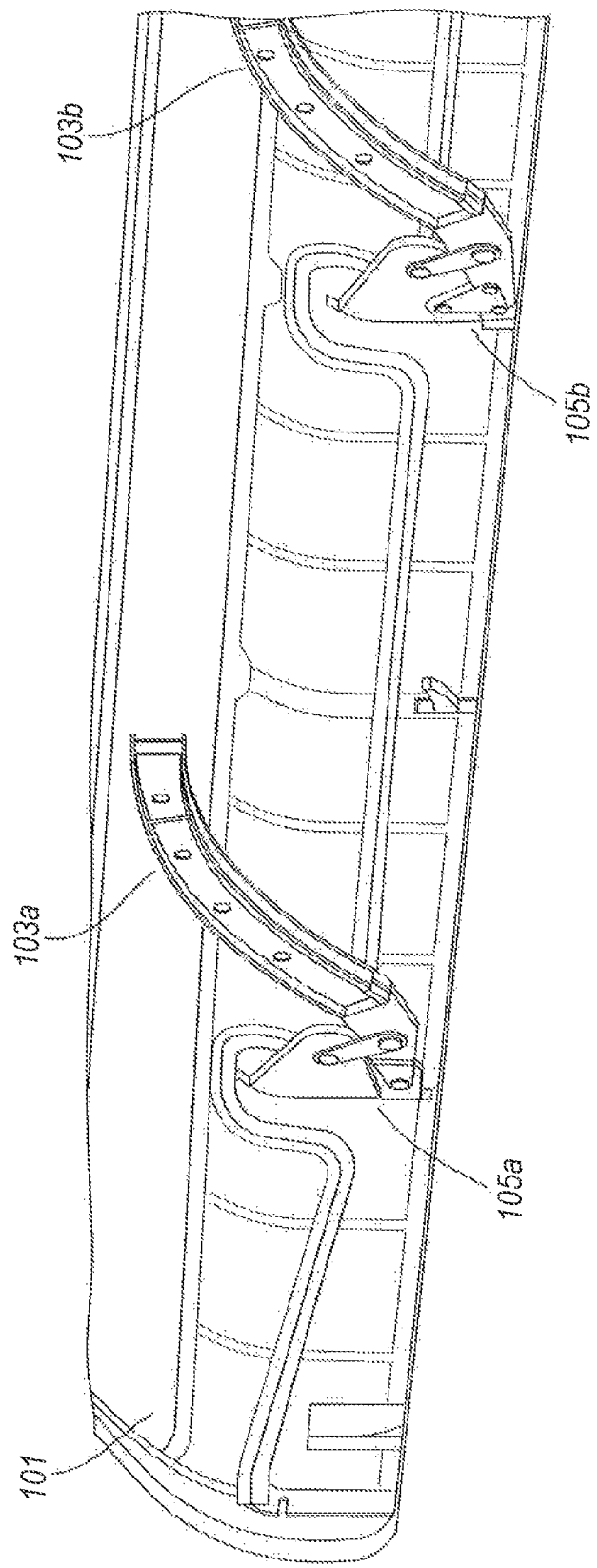
FIG. 1 is a rear perspective view of a known slat assembly.

FIG. 1 is a rear perspective view of a known slat assembly. The assembly comprises a slat 101 connected to two arcuate tracks 103a, 103b mounted on a fixed wing structure (not shown). The tracks 103a, 103b are moveable relative to the fixed wing between an extended position in which the slat is deployed, and a stowed position, in which the slat is stowed on the fixed wing leading edge. The assembly comprises actuators (not shown) for moving the tracks 103a, 103b by way of a rack and pinion connection (not shown).

The tracks 103a, 103b are connected to the slat 101 by joints 105a, 105b (sometimes referred to as knuckle joints). In this known design, the first track 103a is connected to the slat 101 by a master joint 105a and the second track 103b is connected to the slat 101 by a sub-master joint 105b. The master joint 105a is shown in more detail in FIG. 2A and the sub-master joint is shown in more detail in FIG. 2B.

Figure 2A:
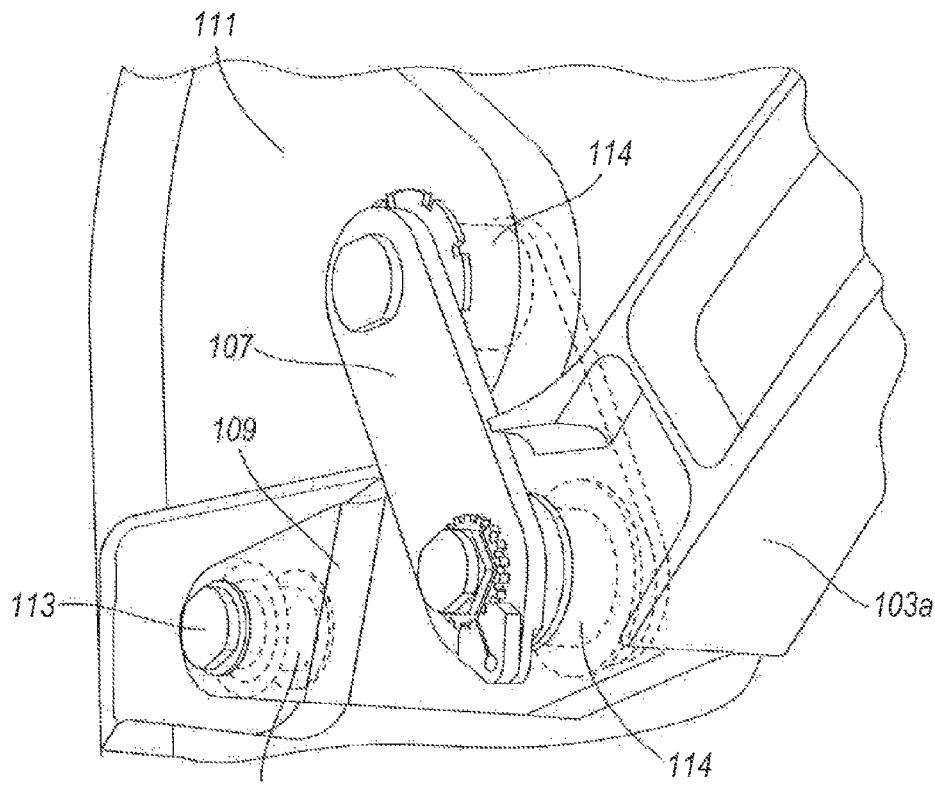
FIGS. 2A and 2B are close-up views of the master and sub-master joints in the known assembly of FIG. 1.

Referring first to FIG. 2A, the master joint 105a comprises a link 107 coupling a lug 109 on the track 103a to a lug 111 on the back of the slat 101. The joint also comprises a fixed pivot 113 passing through both lugs 109, 111. The link 107 and the fixed pivot 113 are mounted on spherical bearings 114 (only the outer housing of the bearings is shown in FIG. 2A). As a result of the arrangement of the link 107 and fixed pivot 113 in the master joint 105a, it will be appreciated that the pitch of the slat is essentially fixed relative to the track. The spherical bearings 114 in the joints do, however, allow a small amount of relative rotation between the slat 101 and track 103a (which typically occurs due to distortion of the slat under load during use).

Figure 2B:
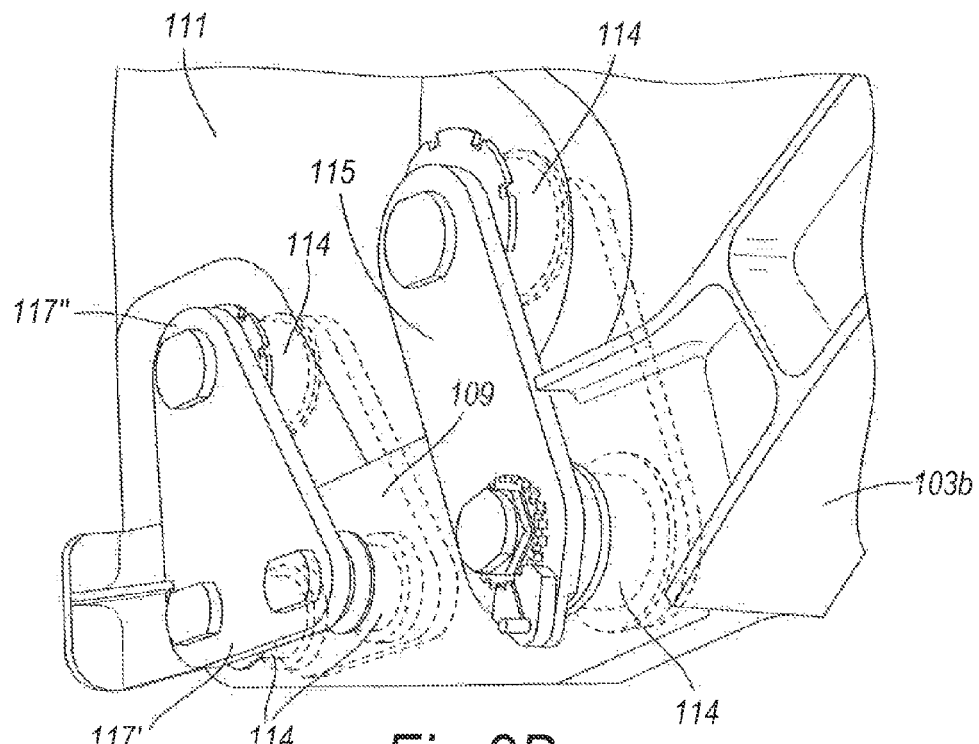

Referring now to FIG. 2B, the sub-master joint 105b is broadly similar to the master joint except that it comprises a second, triangular, link 117 (instead of the fixed pivot). The triangular link 117 is coupled to the lug 109 on the track 103b in two locations at the base 117' of the link, and coupled to the lug 111 on the slat 101 at a single location at the top of the link 117". It will be appreciated that as with the master joint, the sub-master joint is arranged such that the pitch of the slat (relative to the track 103b) is substantially fixed. The links 115 and 117 are mounted on spherical bearings 114 (only the outer housing of the bearings is shown in FIG. 2B). The spherical bearings 114 allow a small amount of relative rotation between the slat and tracks. The sub-master joint also allows a small amount of lateral movement which may occur, for example due to thermal expansion/contraction of the slat. By allowing these small-scale movements, excessive loads are prevented from building up in the joints.

The actuators (not shown) used to move the slat in this known design are extremely robust and have met previous airworthiness requirements. New airworthiness requirements may now require failure of an actuator to be considered. In the event of this theoretical failure of an actuator, only one of the tracks might be driveable between an extended and stowed position. In the above-mentioned design, the spherical bearings can accommodate a very small scale rotation of the slat, but under any substantive differential movement of the tracks (causing skew of the slat), the links 107, 115, 117 would begin to interfere with the lugs 109, 111 on the slat/track and excessive loads may be generated. This would prevent the working track from continuing to operate without risking damage or failure of the joint(s).

It is desirable to provide a slat assembly that complies with the new airworthiness requirements outlined above. To date, there has been a focus on providing monitoring systems to provide a warning when the slat begins to become skewed such that further differential movement of the tracks can be stopped. Examples of monitoring systems are shown in EP0726201 and EP1088753.

Figure 3A:
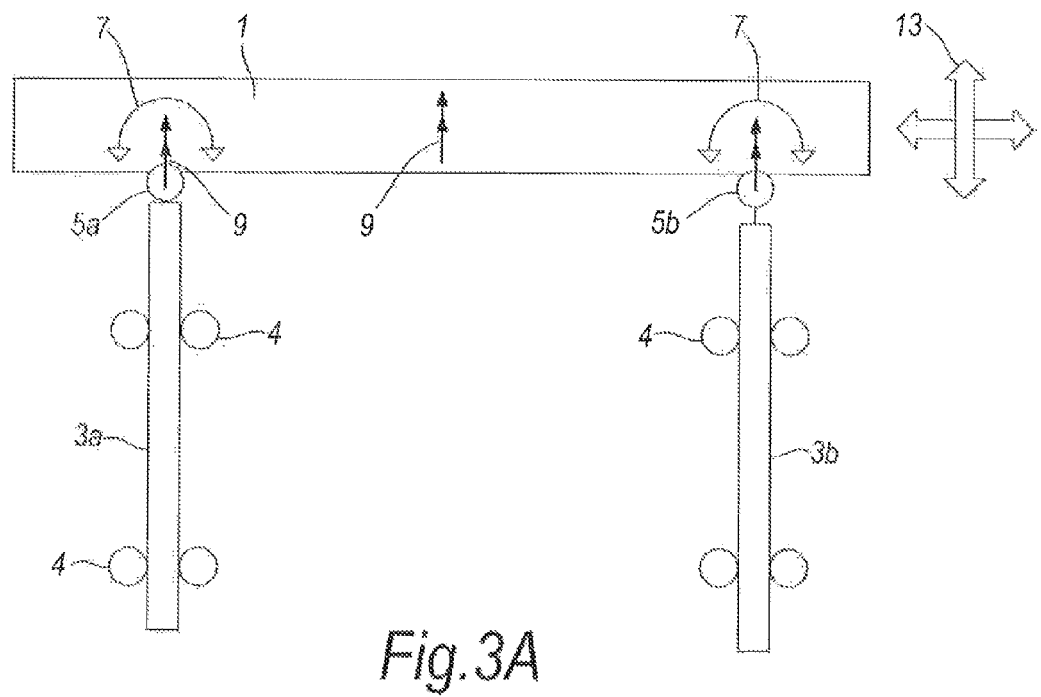
FIG. 3A is a highly schematic plan view of an aircraft slat assembly according to a first embodiment of the invention, the slat being in the fully deployed position.

FIG. 3A is a highly schematic plan view of an aircraft slat assembly according to a first embodiment of the invention. The slat assembly comprises a slat 1, two tracks 3a, 3b and two joints 5a, 5b. Each joint 5a, 5b connects a respective track 3a, 3b to a lug (not shown in FIG. 3A) on the rear face of the slat 1.

Figure 5:
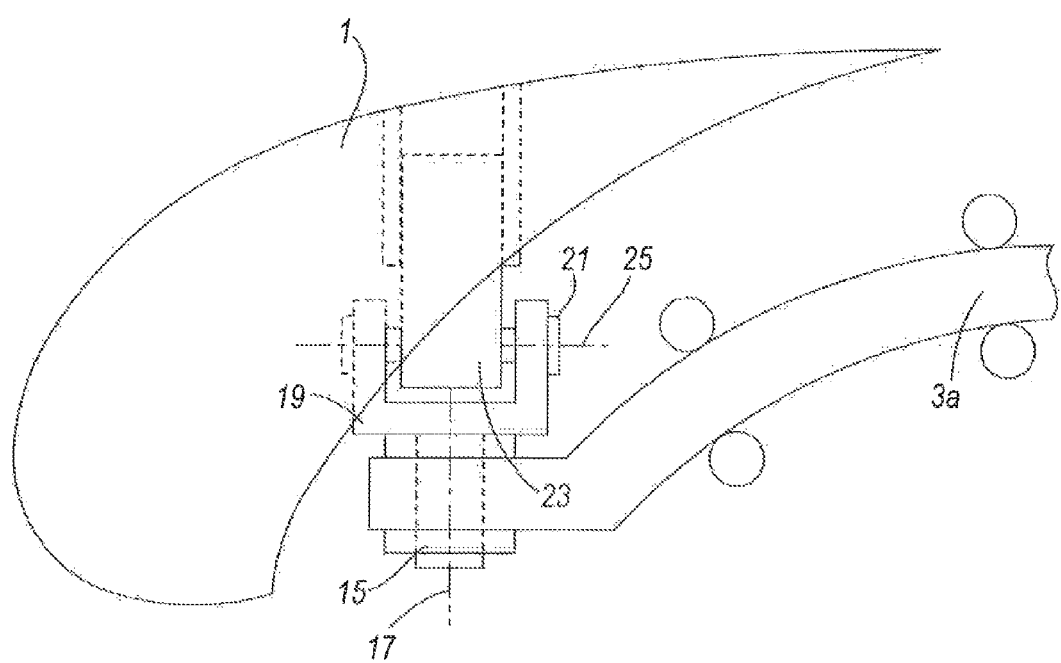
FIG. 5 is a sectional view through the slat in FIG. 3A, showing the master joint.
Figure 7:
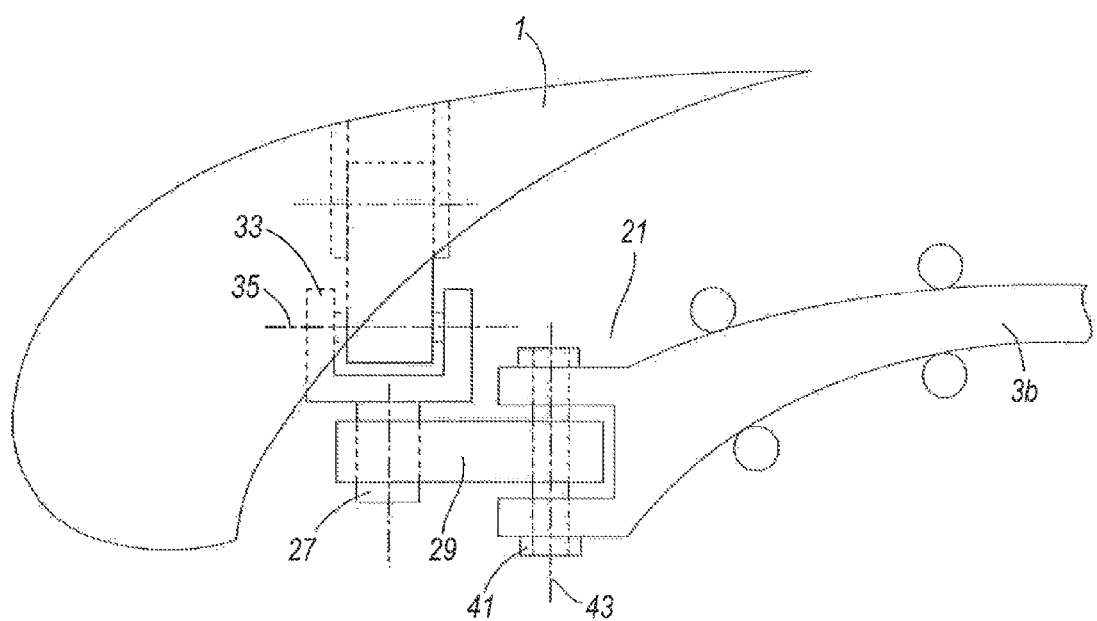
FIG. 7 is a sectional view through the slat in FIG. 3A, showing the sub-master joint.

The tracks 3a, 3b are orientated parallel to one another and are both arcuate (although this is not apparent from the plan view in FIG. 3 and is better shown in FIGS. 5 and 7). The tracks are received between pairs of rollers 4 positioned either side of the tracks. The rollers 4 are mounted on the fixed wing structure (not shown) and react any lateral loads to which the tracks are subjected onto the fixed wing structure.

The slat assembly includes an actuator assembly (not shown) for driving the tracks. The actuator assembly comprises a single, motor-driven, drive shaft which is coupled, via respective gearboxes, to each track. The output of each gearbox is a pinion which is meshed with a rack on each track to convert the rotary output of the common drive shaft, into translational movement of the tracks. The actuator assembly includes a safety mechanism in the form of a torque-limiter which is arranged to trip the drive mechanism in the event of an unduly high torque occurring.

The features described above are generally known in existing slat assemblies (for example, that shown in FIGS. 1 to 2B). However, in contrast to known slat assemblies, and as will be apparent from the description below, the joints 5a, 5b in this embodiment of the present invention are arranged to allow relative rotation between the slat 1 and each respective track 3a, 3b such that the slat 1 is able to adopt a skewed position. More particularly, the slat assembly is able to adopt a skewed position in which one track is in the fully extended position and the other track is in the stowed position.

Figure 3B:
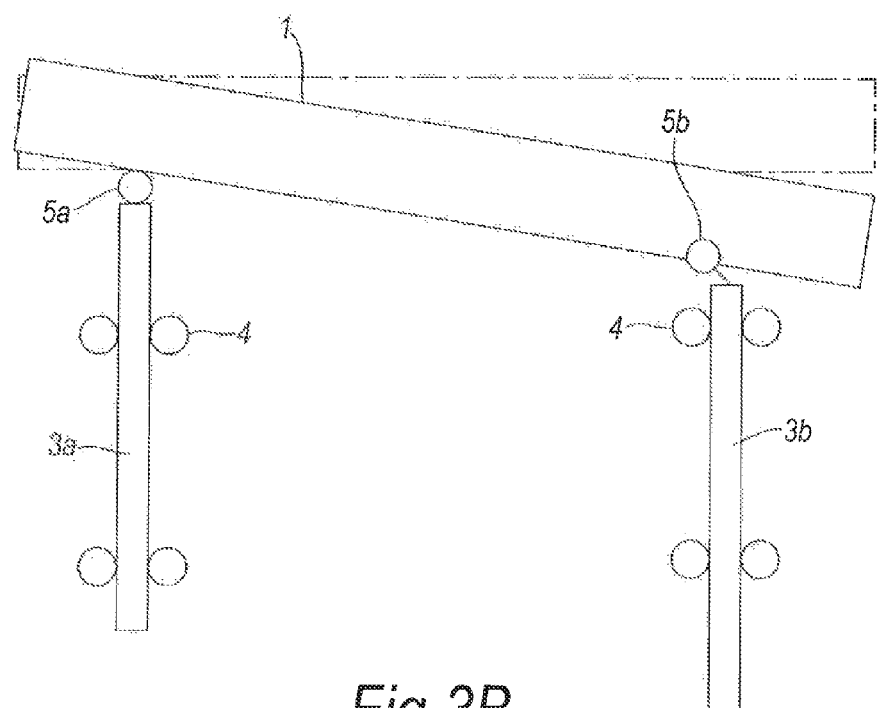
FIG. 3B is a highly schematic plan view of the aircraft slat assembly of FIG. 3A, with the slat skewed.

Such a skewed position is shown in FIG. 3B. In this position, the left-hand track 3a has remained fixed in the extended position, whereas the right-hand track 3b has been retracted to the stowed position. The deployed (unskewed) position of the slat 1 is shown in dashed lines in FIG. 3B. The skewed position may occur in the (largely theoretical) event of the torque limiter failing and/or the gear box failing. In such an event, the back driving torque may be sufficiently high to cause the track to jam, or there may be no drive through the gear box. These types of condition can be referred to as Down Drive Disconnect Through Drive Maintained (DDDTDM).

By allowing movement of the slat to this extreme skewed position, the negative consequences of actuator failure are much reduced (i.e. the risk of damage or failure of joints, or other components, within the slat assembly is avoided). By providing an assembly that can adopt this skewed position, the need to monitor or measure the skew is also reduced.

The degrees of freedom of the joints are shown by arrows 7, 9, 11, 13 in FIG. 3A. Arrows 7 indicate the possible relative rotation of the slat about a vertical axis (out of the page in FIG. 3A), which may be caused by both aerodynamic loads and/or differential movement of the tracks. Double-headed arrows 9 indicate the notional axes of rotation when the slat is subjected to bending (caused by aerodynamic loads and/or differential movement of the tracks). Arrow 11 indicates the possible lateral movement of the slat caused by thermal expansion, aerodynamic loads and/or differential movement of the tracks. Arrow 13 shows the possible forward/aft movement of the slat caused by differential movement of the tracks.

FIGS. 4A to 4C are three schematic views of the master joint in the slat assembly of FIG. 3A. FIG. 4A shows a plan view of the master joint from above, and FIG. 4C shows a plan view of the master joint from below. FIG. 4B is a side view of the master joint (showing only the distal end of the track 3a). FIG. 5 is a sectional view through the slat, showing the master joint. The views show the layout of the joint when the slat is deployed (and not skewed).

Referring to FIGS. 4A to 5, the master joint 5a comprises a circular cylindrical spindle 15 rotatably mounted in the distal end of the track 3a. The spindle 15 is received in a bearing in the track 3a and is freely rotatable about its longitudinal axis 17. The spindle 15 is received in the bearing in fixed orientation relative to the track 3a. In the embodiment shown in FIGS. 4A to 4C, this fixed orientation is substantially vertical and perpendicular to the structure at the distal end of the track 3a (most clearly shown in FIG. 5).

The upper end of the spindle 15 holds a U-shaped frame 19 which supports an axle 21 that is orthogonal to the axis 17 of the spindle 15. The axle 21 passes through a hole in the lug 23 on the rear of the slat 1 and is arranged to allow the slat 1 to rotate about the axis 25 defined by the axle 21. Since the axle 21 is held in the frame 19, the axis 25 is also rotatable about the vertical axis 17. It will be appreciated that the above-described arrangement allows free rotation of the slat 1, about these two orthogonal axes 17, 25, relative to the track 3a.

Figure 6A:
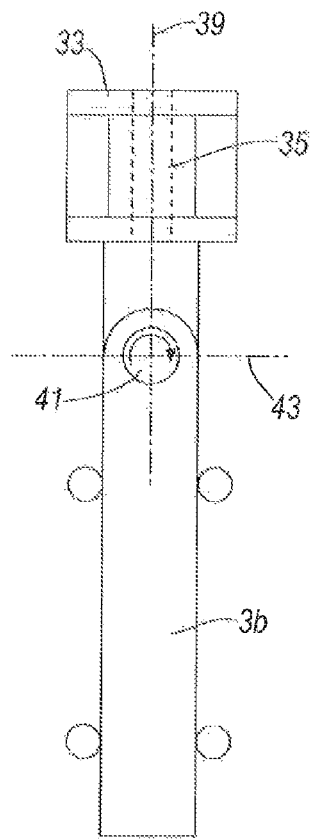
FIGS. 6A to 6C are three schematic views of the sub-master joint in the slat assembly of FIG. 3A.
Figure 6B:
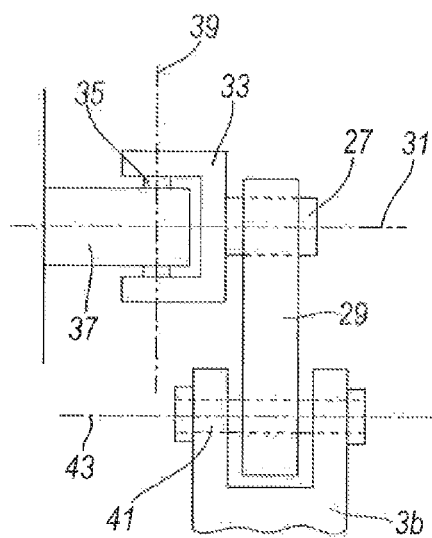
Figure 6C:
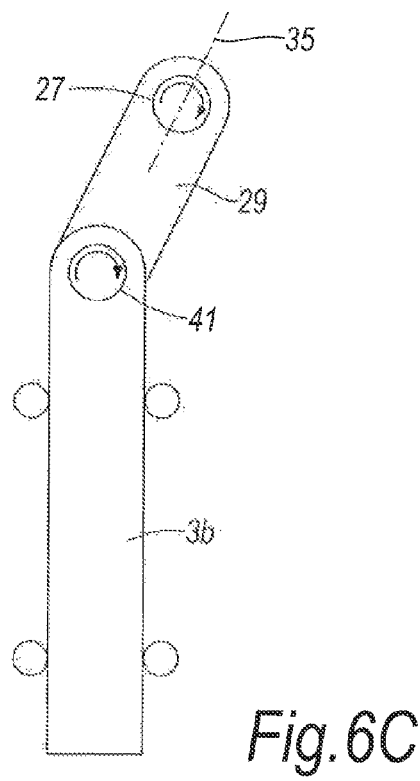

FIGS. 6A to 6C are three schematic views of the sub-master joint in the slat assembly. FIG. 6A shows a plan view of the sub-master joint from above, and FIG. 6C shows a plan view of the sub-master joint from below. FIG. 6C is a plan view of the sub-master joint. FIG. 7 is a sectional view through the slat, showing the sub-master joint.

Referring to FIGS. 6A to 6C, the distal end of the sub-master joint 5b is substantially identical to the master joint. In this regard, the distal end of the sub-master joint comprises a circular cylindrical spindle 27, rotatably mounted on a swing link 29 (rather than the track itself). The spindle 27 is received in a bearing and is freely rotatable about its longitudinal axis 31. The spindle 27 is fixedly-orientated relative to the track 3b and relative to the swing link 29. In the embodiment shown in FIGS. 6A to 7, this fixed orientation is substantially vertical and perpendicular to the structure at the distal end of the track 3b (most clearly shown in FIG. 7).

As with the master joint, the upper end of the spindle 27 also holds a U-shaped frame 33 which supports an axle 35 that is orthogonal to the axis 31 of the spindle 27. The axle 35 passes through a hole in the lug 37 on the rear of the slat 1 and is arranged to allow the slat 1 to rotate about the axis 39 defined by the axle 35.

The swing link 29 connects the above-mentioned distal end of the sub-master joint 5b, to the track 3b. The link 29 is pivotably mounted on the track about an axle 41 passing through the end of the track 3b. The swing link 29 is pivotable about this axis 43 defined by the axle 41, such that the sub-master joint 5b allows lateral movement of the slat 1 relative to the track.

The combination of the master joint 5a and sub-master joint 5b, allows free rotation of the slat 1 relative to the tracks 3a, 3b such that the slat 1 is able to adopt the skewed position (see FIG. 3B). The spindles 15, 27 on each joint accommodate the component of rotation about vertical axes 17, 31, and the axles 21, 35 in the U-shaped frames 19, 33 accommodate rotation about horizontal axes 25, 39. The pivoted swing link 29 accommodates the lateral movement of the slat 1 relative to the track 3b. The slat is therefore able to adopt skewed position in which one of the tracks is in an extended position, and one of the tracks is in the stowed position. The slat may also adopt any intermediate position in which the tracks have undergone a differential movement.

Whilst the present invention has been described and illustrated with reference to a particular embodiment, it will be appreciated by those of ordinary skill in the art that the invention lends itself to many different variations not specifically illustrated herein. For example, the slat assembly may comprise more than two joints and more than two tracks, for example the slat assembly may comprise a multiplicity of joints, each joint connecting a respective track to the slat, and each joint being arranged to allow relative rotation between the slat and the respective track such that the slat is able to adopt a skewed position. The tracks need not necessarily be arcuate, and may for example be linear. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An aircraft slat assembly comprising a slat, two tracks and two joints, each joint connecting a respective track to the slat, and each track being moveable on a wing structure between a fully extended position and a stowed position,
   wherein each joint is arranged to allow relative rotation between the slat and the respective track such that the slat is able to adopt a skewed position in which one track is in the fully extended position and the other track is in the stowed position.

2. An assembly according to claim 1, wherein the slat is rotatably moveable about a first axis in each joint, the first axis being fixedly orientated relative to the respective track.

3. An assembly according to claim 2, wherein the slat is also rotatably moveable about a second axis in each joint, the second axis being fixedly orientated relative to the first axis.

4. An assembly according to claim 3, wherein the second axis is perpendicular to the first axis.

5. An assembly according to claim 3 wherein the second axis is rotatable about the first axis.

6. An assembly according to claim 1, wherein only one of the two joints is arranged to allow lateral movement of the slat relative to the respective track.

7. An assembly according to claim 6, wherein said only one of the joints comprises a link pivotably mounted on the track.

8. An assembly according to claim 1, further comprising an actuator assembly for moving the tracks between the stowed and fully extended positions, the actuator assembly comprising a common drive means arranged to drive both tracks.

9. A method of moving an aircraft slat of an aircraft slat assembly comprising two track tracks and two joints, each joint connecting a respective track to the slat, and each track being moveable on a wing structure between a fully extended position and a stowed position, the method comprising a step of moving at least one of two tracks connected to the slat such that the slat adopts a skewed position in which one track is in a fully extended position and the other track is in a stowed position.

* * * * *